United States Patent
Mortier et al.

(10) Patent No.: US 10,253,640 B2
(45) Date of Patent: Apr. 9, 2019

(54) PLATFORM OF SMALL HUB-TIP RATIO

(71) Applicant: SAFRAN AIRCRAFT ENGINES, Paris (FR)

(72) Inventors: Roland Mortier, Combs la Ville (FR); Sylvain Bourseaulx, Ermont (FR); Antoine Masson, Paris (FR); Anne-Laure Ravier, Nogent sur Marne (FR); Noemie Steenbakker, Quincy Sous Senart (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 208 days.

(21) Appl. No.: 14/959,272

(22) Filed: Dec. 4, 2015

(65) Prior Publication Data

US 2016/0160663 A1 Jun. 9, 2016

(30) Foreign Application Priority Data

Dec. 8, 2014 (FR) ..................... 14 62037

(51) Int. Cl.
*F01D 5/30* (2006.01)
*F01D 11/00* (2006.01)

(52) U.S. Cl.
CPC .......... *F01D 5/3007* (2013.01); *F01D 11/008* (2013.01); *F05D 2220/36* (2013.01); *F05D 2300/44* (2013.01); *F05D 2300/603* (2013.01); *F05D 2300/6033* (2013.01); *Y02T 50/672* (2013.01)

(58) Field of Classification Search
CPC ...... F01D 11/08; F01D 5/3007; F01D 11/008; F01D 5/30; B29C 70/24; B29C 70/682; B29C 70/68; F05D 2260/60; Y02T 50/672
See application file for complete search history.

(56) References Cited

U.S. PATENT DOCUMENTS

| 2010/0290910 | A1* | 11/2010 | Hoyland | F01D 11/008 416/193 R |
| 2012/0148388 | A1* | 6/2012 | Bottome | F01D 11/008 415/170.1 |
| 2012/0244003 | A1 | 9/2012 | Mason | |
| 2013/0108417 | A1* | 5/2013 | Renon | B29B 11/16 415/173.1 |
| 2014/0186187 | A1 | 7/2014 | Lamboy et al. | |
| 2015/0167209 | A1 | 6/2015 | Marchal et al. | |

FOREIGN PATENT DOCUMENTS

EP 2 503 102 A2 9/2012
WO WO 2013/160584 A1 10/2013

OTHER PUBLICATIONS

French Preliminary Search Report dated Jul. 29, 2015 in French Application 14 62037 filed on Dec. 8, 2014 (with English Translation of Categories of Cited Documents).

* cited by examiner

*Primary Examiner* — Jason Shanske
*Assistant Examiner* — Maxime Adjagbe
(74) *Attorney, Agent, or Firm* — Oblon, McClelland, Maier & Neustadt, L.L.P.

(57) ABSTRACT

A platform for a bladed wheel having a small hub-tip ratio, suitable for being fabricated out of composite material from a three-dimensionally woven fiber preform, the platform including a bottom wall, a top wall defining an air flow passage, and two side walls extending transversely between the bottom wall and the top wall, wherein the side walls extend longitudinally beyond the upstream end of the bottom wall. The platform further includes a fastener tab that is folded from the upstream end of the bottom wall.

8 Claims, 3 Drawing Sheets

PLATFORM OF SMALL HUB-TIP RATIO

FIELD OF THE INVENTION

The present description relates to a fiber preform suitable for fabricating lightweight platforms and for providing a small hub-tip ratio. The present description also relates to such a platform, and to a bladed wheel, e.g. a fan wheel, and to a turbine engine including such platforms.

Such platforms may be used in particular in the field of aviation, within airplane turbojet or helicopter turboshaft engines, to mention only two examples.

STATE OF THE PRIOR ART

In an airplane turbojet, the platforms of various bladed wheels, and in particular of the fan, need to perform numerous functions.

Their main function is to define the air flow passage, while minimizing aerodynamic disturbances not only at their own bladed wheel, and also at other bladed stages that are situated downstream: in particular, they must define coherent interfaces at the boundaries with the other stages.

They must also be capable of withstanding large forces without suffering significant deformation and without becoming detached from the disk on which they are mounted in order to ensure safety and availability of the engine for commercial use.

In order to satisfy these various requirements, certain configurations have been proposed in which platforms possess a first portion, serving to define the air flow passage and to retain the platform while the engine is rotating, and a second portion serving to limit deformation of the first portion under the effect of centrifugal forces and to keep the platform in position when the engine is stopped.

In some of those configurations, the platforms are in the form of boxes having a two-dimensional top portion that is held upstream and downstream and that is carried by a U-shaped support portion.

Nevertheless, such a box configuration is bulky, thereby leading to problems of weight and of integration, and in particular leading to a large hub-tip ratio, where the hub-tip ratio is the ratio of the radius measured between the axis of rotation and the point of the leading edge of the airfoil that is flush with the surface of the platform, divided by the radius measured between the axis of rotation and the outermost point (tip) of the leading edge.

In other configurations, the top portion is simultaneously held upstream and downstream and also supported by two arms provided at their distal ends with hooks engaging with hooks carried by the disk of the wheel.

Once more, the complexity of such fastening leads to problems of weight and of integration, also leading to a large hub-tip ratio.

There thus exists a real need for a fiber preform, a platform, a bladed wheel, and a turbine engine that suffer less or not at all from the drawbacks inherent to the above-described known configurations.

SUMMARY OF THE INVENTION

The present description provides a fiber preform for a platform of a bladed wheel, the preform comprising a first fiber structure possessing a bottom portion, and two side portions extending transversely from the bottom portion; the side portions extend longitudinally beyond the upstream end of the bottom portion, and the first fiber structure also possesses a fastener tongue that is folded downstream from the upstream end of the bottom portion.

In the present description, the terms "longitudinal", "transverse", "bottom", "top", and their derivatives are defined relative to the main direction of the platform under consideration; the terms "axial", "radial", "tangential", "inner", "outer", and their derivatives are defined relative to the main axis of the turbine engine; the term "axial plane" is used to designate a plane containing the main axis of the turbine engine, and the term "radial plane" is used to designate a plane perpendicular to that main axis; finally, the terms "upstream" and "downstream" are defined relative to the air flow direction through the turbine engine.

By means of such a platform, it is possible to use composite material to make a platform for a bladed wheel that is simultaneously strong, lightweight, and compact.

Using such a composite material enables a large amount of weight to be saved compared with conventional platforms made out of metal. Such a saving in weight thus provides improved performance and reduced fuel consumption.

This configuration, which includes side walls obtained from side portions of the preform and extending transversely from a bottom wall, itself obtained from the bottom portion of the preform, also serves to provide the platform with good mechanical strength, in particular against centrifugal forces acting radially, and thus along the direction of the side walls. This serves to reduce the deformation of the platform in operation and thus to reduce disturbances to the air flow passage.

Furthermore, because of this bottom portion of length that is shorter than the length of the side portions and that does not extend to the upstream end of the preform, the platform is more compact at its upstream portion, thereby providing greater freedom in designing the platform in this region. Thus, because of this configuration, it is possible to bring the upstream end of a top wall of the preform, i.e. the portion that is in contact with the air flow passage, closer to the tooth of the disk that carries them, thus making a greater length available for the airfoil and thus reducing the hub-tip ratio, thereby increasing the performance of the bladed wheel.

This preform also has the advantage of providing a fiber structure that includes a fastener tongue that is secured directly to the bottom wall: this makes it possible to obtain a fastener tab for the platform enabling it to be hooked on the tooth of the disk. This fastener tab is thus formed integrally with the platform, further reinforcing its mechanical strength. The fastener tab also makes it possible to hold the platforms while the turbine engine is stopped and the upstream shroud is removed.

In certain embodiments, the first fiber structure is constituted by a single sheet that is woven three-dimensionally as a single piece. This makes it easy to obtain the bottom portion, the side portions, and the fastener tongue, and to obtain them in a single weaving step.

In certain embodiments, the yarns used for weaving the preform are made of carbon fibers. Nevertheless, they could be any other type of yarn, for example made of glass fibers or Kevlar fibers.

In certain embodiments, the weave used for three-dimensionally weaving the preform may be a weave of the 3D interlock type. Nevertheless, the outside surfaces of the preform may be made essentially by two-dimensional weaving, e.g. of satin type.

In certain embodiments, the first fiber structure possesses a number of layers of yarns that is constant over its entire surface, thus making weaving easier to design and perform. The first fiber structure thus possesses a thickness that is constant.

In certain embodiments, the weave is continuous at the junction between the bottom portion and the fastener tongue. When flat, the fastener tongue thus constitutes an extension of the bottom portion. More precisely, the fastener tongue may be a residual portion obtained by cutting away a portion from an initially longer bottom, given that the upstream portion of this initial bottom portion is suitable both for being removed in part by cutting and for being folded in part to form the fastener tongue.

In certain embodiments, the weave is continuous at the junctions between the bottom portion and each of the side portions. When flat, these side portions thus constitute lateral extensions of the bottom portion.

In certain embodiments, the height of the side portions of the first fiber structure diminishes going upstream, such that the upstream ends of said side portions taper. This makes it possible to bring the upstream end of the top wall of the platform closer to the tooth of the disk, thereby making a great length available for the airfoil and thus reducing the hub-tip ratio. The height of the side portions preferably becomes zero at the upstream end of the first fiber structure.

In certain embodiments, the fastener tongue is folded downstream. This serves to provide the platform with a tab in the shape of a hook that is suitable for co-operating with a hook projecting from the top of a tooth of the disk.

In certain embodiments, the preform further includes a second fiber structure possessing a top portion and two side portions extending transversely from the top portion. The top portion makes it possible to form a top wall of the platform, i.e. the wall that comes directly into contact with the air flow passing through the turbojet.

In certain embodiments, the second fiber structure is obtained as a single piece by three-dimensional weaving.

In certain embodiments, each side portion of the second fiber structure is obtained by non-interlinking with a side end panel of the top portion. This makes it easy to obtain a second fiber structure that is in the shape of the Greek letter Pi.

In certain embodiments, the height of the side portions of the second fiber structure diminishes going upstream, such that the upstream ends of said side portions taper. The side portions are preferably of zero height at the upstream end of the second fiber structure.

In certain embodiments, the second fiber structure is engaged with the first fiber structure, the side portions of one of the fiber structures being received between the side portions of the other fiber structure. This makes it easy to obtain a box made from two fiber structures that are individually easy to make by three-dimensional weaving.

In certain embodiments, the side portions of the second fiber structure are received between the side portions of the first fiber structure. Naturally, the inverse configuration is possible.

In other embodiments, the preform has a single fiber structure possessing a bottom portion, two side portions, and a top portion that are woven simultaneously in a single step, e.g. using the method described in international application WO 2013/160584, the fastener tongue then being formed by being cut out from the bottom portion.

The present description also provides a platform for a bladed wheel, the platform comprising a bottom wall, a top wall for defining an air flow passage, and two side walls extending transversely between the bottom wall and the top wall; the side walls extend longitudinally beyond the upstream end of the bottom wall, and the platform further includes a fastener tab that is folded from the upstream end of the bottom wall.

This configuration including side walls that extend transversely from the bottom wall ensures that the platform has good mechanical strength, in particular against centrifugal forces acting radially, and thus in the direction of the side walls.

Because of this bottom wall that is of width that is smaller than the side walls and that does not extend to the upstream end of the platform, the platform is more compact at its upstream end, thereby providing greater freedom for designing the platform in this region. Thus, because of this configuration, it is possible to bring the upstream end of the top wall of the platform closer to the tooth of the disk, thereby releasing greater length for the airfoil and thus reducing the hub-tip ratio, thereby increasing the performance of the bladed wheel.

In certain embodiments, the upstream end of the top wall descends lower than the plane of the bottom wall. The bottom wall can thus rest on an element projecting from the tooth of the disk, e.g. an assembly hook, without that preventing the upstream end of the top wall from coming as close as possible to the tooth of the disk in order to reduce the hub-tip ratio of the bladed wheel.

In certain embodiments, the top wall possesses an upstream assembly portion at its upstream end for co-operating with an upstream assembly member of the turbine engine. This reinforces attachment of the platform.

In certain embodiments, the top wall possesses a downstream assembly portion at its downstream end suitable for co-operating with a downstream assembly member of the turbine engine. This reinforces attachment of the platform.

In certain embodiments, the platform is made as a single piece of composite material by means of a fiber preform in accordance with any of the preceding embodiments, said preform being shaped in a mold and embedded in a matrix. This serves to obtain the advantages described with reference to the above fiber preform.

In certain embodiments, the matrix is of organic type. In particular, it may be an epoxy resin.

In other embodiments, the matrix is of ceramic type.

The present description also provides a bladed wheel for a turbine engine, the wheel comprising a disk suitable for being coupled to a shaft of the turbine engine, the circumference of the disk presenting a succession of slots and of teeth, a plurality of blades mounted in the slots of the disk, and at least one platform in accordance with any one of the preceding embodiments provided between two blades and facing a tooth of the disk, the fastener tab of the platform co-operating with an assembly member of the tooth.

In certain embodiments, the bladed wheel is a fan. Such platforms are particularly suitable for this type of bladed wheel provided between an upstream shroud and a downstream drum of diameters that are very different.

The present description also provides a turbine engine including a bladed wheel in accordance with any of the preceding embodiments.

The present description also provides a method of fabricating a bladed wheel platform, the method comprising the following steps: fabricating a preform in accordance with any of the above described embodiments, shaping the platform by engaging the second fiber structure with the first fiber structure, putting the preform in a mold, and co-injecting a matrix into the mold.

In certain implementations, the step of fabricating the preform includes a step of weaving a first fiber sheet that is a precursor for the first fiber structure, and a step of cutting the first fiber sheet in order to shorten the length of the bottom portion and form the fastener tongue. This cutting operation thus makes it easy to form such a bottom portion of length that is shorter than the side portions together with a fastener tongue that remains after the cutting operation.

In certain implementations, the step of cutting the first fiber sheet is performed by water jet. Such water jet cutting, which is easy to automate, is particularly suitable for cutting such fiber sheets.

The above-mentioned characteristics and advantages, and others, appear on reading the following detailed description of embodiments of the proposed preform and platform. This detailed description refers to the accompanying drawings.

BRIEF DESCRIPTION OF THE DRAWINGS

The accompanying drawings are diagrammatic and seek above all to illustrate the principles of the invention.

In the drawings, from one figure to another, elements (or portions of element) that are identical are identified by the same reference signs.

DETAILED DESCRIPTION OF EMBODIMENT(S)

In order to make invention more concrete, embodiments of the invention are described below in detail with reference to the accompanying drawings. It should be recalled that the invention is not limited to these embodiments.

Figure 1:
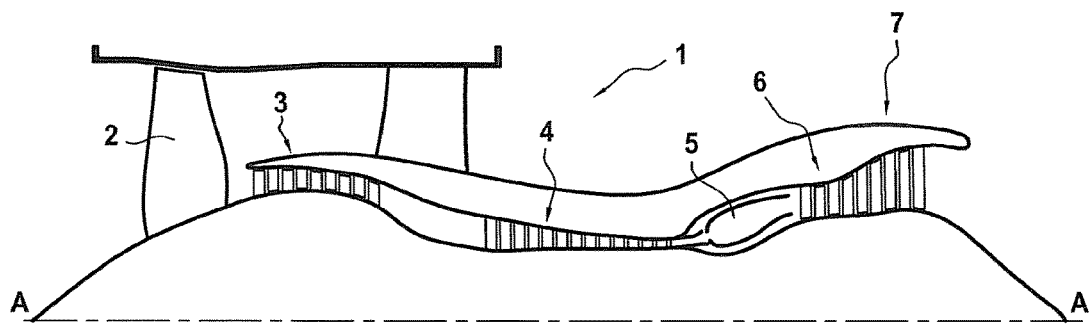
FIG. 1 is a diagrammatic axial section view of a turbine engine of the invention.

FIG. 1 is a section view on a vertical plane containing its main axis A and showing a bypass turbojet 1 of the invention. From upstream to downstream in the air stream flow direction, it comprises: a fan module 2; a low-pressure compressor 3; a high-pressure compressor 4; a combustion chamber 5; a high-pressure turbine 6; and a low-pressure turbine 7.

Figure 2:
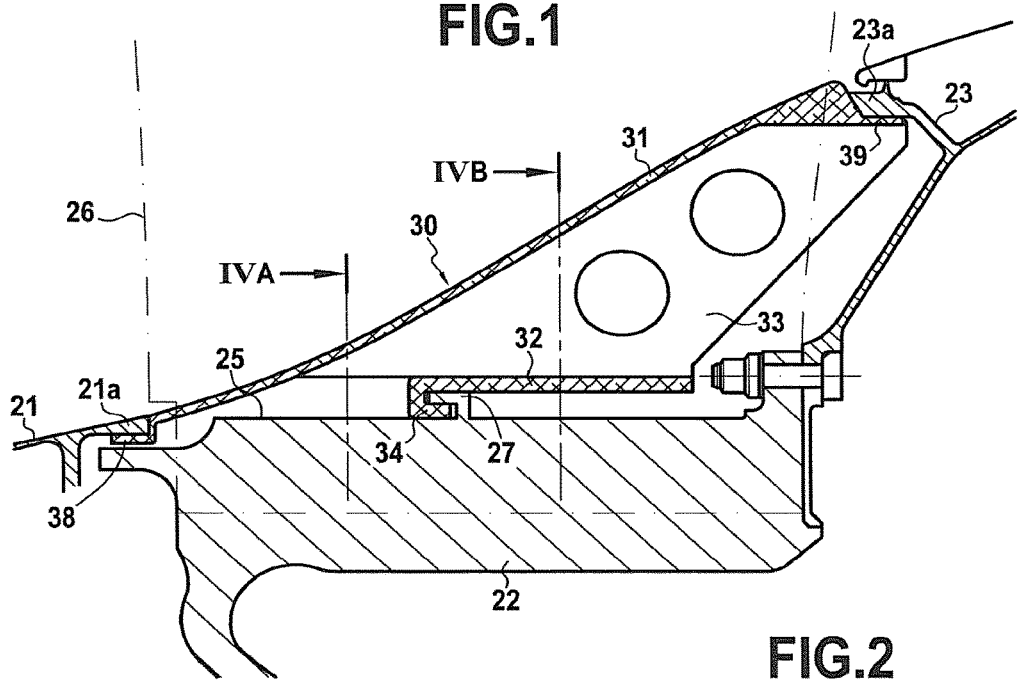
FIG. 2 is a section view of a fan module.

The fan module 2 is shown in greater detail in FIG. 2. It comprises an upstream shroud 21 (or nose cone), a fan disk 22, and a downstream drum 23 also referred to as a "booster drum". At its downstream end, the upstream shroud 21 presents a retaining flange 21a. At its upstream end, the downstream drum 23 presents a retaining flange 23a.

Figure 3:
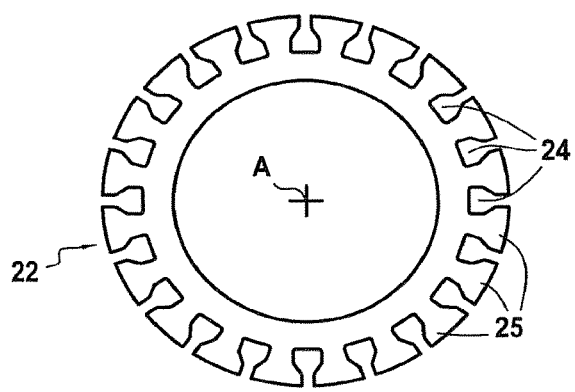
FIG. 3 is a face view of a fan disk.

As can be seen in FIG. 3, a plurality of slots 24 are formed in the outside surface of the fan disk 22: these slots 24 are rectilinear and they extend axially from upstream to downstream all along the disk 22. They are also regularly distributed all around the axis A of the disk 22. In this way, each slot 24 co-operates with its neighbour to define a tooth 25 that thus likewise extends axially from upstream to downstream all along the disk 22.

The fan module 2 also comprises a plurality of blades 26, each blade 26, of curvilinear profile, being mounted in a slot 24 of the fan disk 22. For this purpose, the root of each blade 26 may present a fir tree shape or a dovetail shape matching the shape of the slots 24.

Finally, the fan module 2 includes a plurality of platforms 30, a platform 30 being provided between each pair of successive blades 26, and thus in register with each of the teeth 25 of the fan disk 22.

The upstream shroud 21 and the downstream drum 23 are connected to the disk 22, which disk is coupled to the low-pressure shaft of the turbojet 1. Thus, while the turbojet is in operation, the upstream shroud 21, the fan disk 22, the blades 26, and the downstream drum 23 are driven together in rotation by the low-pressure turbine 7. The platforms 30, mounted between the upstream shroud 21 and the downstream drum 23 are thus likewise driven together with them.

Each platform 30 is essentially in the form of a box with a top wall 31 defining an air flow passage, a bottom wall 32, and two side walls 33.

The top wall 31, forming the top or outside face of the platform 30, extends the upstream shroud 21 in a downstream direction, and it extends the downstream drum 23 in an upstream direction so as to define the air flow passage through the fan module 2. The top wall 31 thus possesses a sloping profile, since the diameter of the downstream drum 23 is greater than the diameter of the upstream shroud 21. The top wall 31 also includes an upstream assembly step 38 at its upstream end, and a downstream assembly step 39 at its downstream end.

The bottom wall 32 enables the platform to rest on the tooth 25 while the turbojet is stopped. In the invention, the length of the bottom wall 32 is shorter than the length of the top wall 31 and than the length of the side walls 33. In particular, the bottom wall 32 terminates at its upstream end before the upstream ends of the side walls 33 and before the upstream end of the top wall 31. Under such circumstances, the top wall 31 may go down lower in an upstream direction, i.e. it may go radially further inwards, than the level of the bottom wall 32. In this example, it can be seen in particular that the upstream end of the wall 31 thus goes down to the level of the top of the tooth 25.

The platform 30 also has a fastener tab 34 extending from the upstream end of the bottom wall 32 and folded downstream in such a manner as to be hook-shaped. In the fan module 2, this tab 34 co-operates with an attachment member 27, which is in the form of a complementary hook, projecting from the top of the tooth 25. Said attachment member is not shown in FIG. 3. The fastener tab 34 thus serves to hold the platform 30 against centrifugal force while the turbojet is in operation. It should also be observed that the bottom wall 32 rests on the outside surface of the attachment member 27 of the tooth 25 rather than on the outside surface of the tooth 25. This attachment member 27 also enables the platform to be held when the turbine engine is stopped and the upstream shroud 21 is removed.

The side walls 33 connect together the top wall 31 and the bottom wall 32, and they act as a stiffener so as to ensure that the assembly presents mechanical strength, in particular against centrifugal forces, thereby limiting its deformation in operation.

Thus, as can be seen clearly in FIG. 2, on going from downstream to upstream, the bottom wall 32 of the box is interrupted, and then the side walls 33, which taper going away from the downstream end, come to an end in turn, whereas the top wall 31, which descends continuously from the downstream end, reaches the plane of the bottom wall 32: as a result only the top wall 31 remains at the upstream end of the platform 30 and it meets the upstream shroud 21 at the top of the tooth 25 of the disk 22.

Figure 4A:
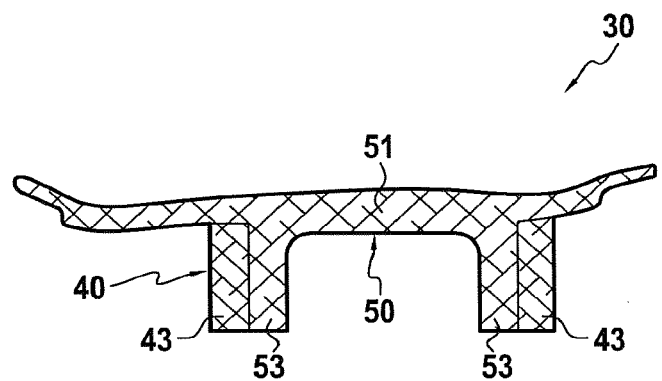
FIGS. 4A and 4B are section views on planes IVA and IVB, respectively, of FIG. 2.
Figure 4B:
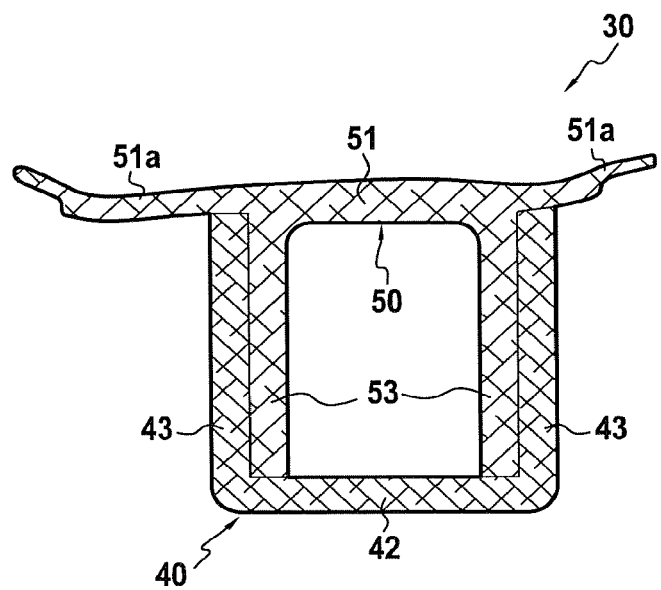

As can be seen better in FIGS. 4A and 4B, the platform is made of composite material using two fiber structures 40 and 50 that are engaged one inside the other and co-injected.

The first fiber structure 40 is essentially U-shaped. It thus has a bottom portion 42 and two side portions 43 extending perpendicularly from the side ends of the bottom portion 42.

Nevertheless, it may be observed that the side portions 43 extend upstream beyond the upstream end of the bottom portion 42; the height of the side portions also diminishes in the upstream direction.

The second fiber structure 50 is essentially in the shape of the Greek letter Pi. It thus possesses a top portion 51 defining an air flow passage and two side portions 53 extending perpendicularly from the top portion 51. The height of these side portions 53 also diminishes going in the upstream direction; furthermore, it may be observed that the top portion 51 extends upstream beyond the upstream end of the side portions 53.

It can thus be seen that the second fiber structure 50 is engaged in the first fiber structure 40 by engaging its side portions 53 between the side portions 43 of the first fiber structure 40, the spacings between the side portions 43 and 53 of the fiber structures 40 and 50 being adjusted so that each side portion 43 of one of the structures 40 comes into contact with one of the side portions 53 of the other structure 50 so as to form single-piece side walls 33 for the platform 30.

Figure 5:
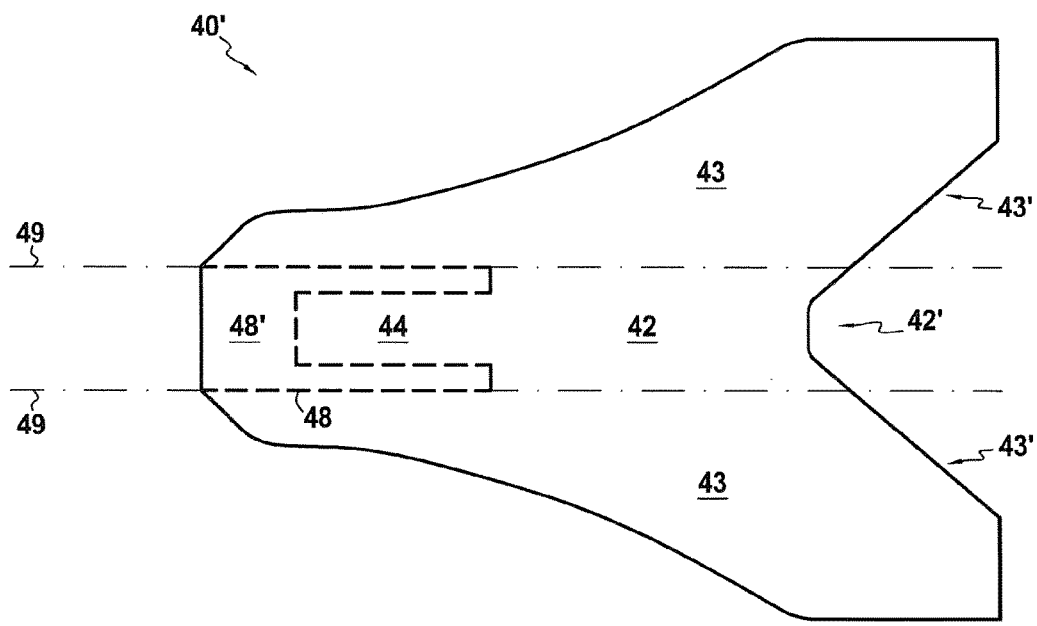
FIG. 5 is a flat view of a first fiber structure.
Figure 6:
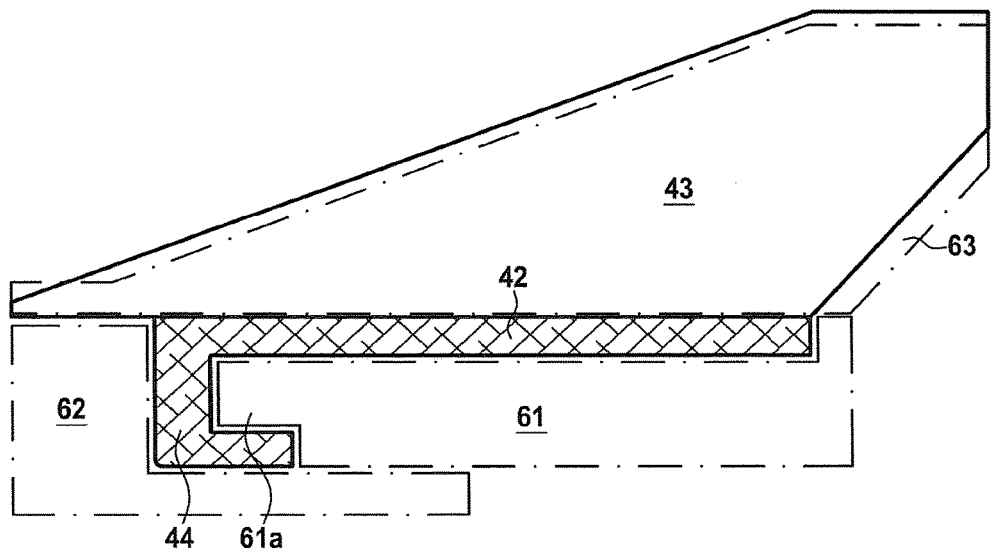
FIG. 6 shows this first fiber structure put into shape.

The weaving and the shaping of the first fiber structure 40 are described below in detail with reference to FIGS. 5 and 6.

In this example, the fiber structures 40 and 50 are woven three-dimensionally out of carbon fibers using a 3D interlock weave. The surfaces of the fiber structures 40 and 50 are woven two-dimensionally using a satin type weave.

The weaving of the first fiber structure 40 comprises weaving flat a precursor fiber sheet 40' made up of a constant number of layers of yarns. This sheet 40' comprises a central strip 42' and two side flanges 43' that are outlined by chain dotted lines 49 that represent fold lines.

This sheet 40' is then subjected to automatic cutting by water jet in order to remove the upstream portion 48' of the central strip 42' as outlined by dashed line 48 representing the line of cut. At the end of this cutting operation, the remaining portion of the central strip 42' corresponds to the bottom portion 42 and to the tongue 44 of the first fiber structure 40.

The fiber structure 40 as obtained in this way is then moistened in order to soften it and enable the fibers to be shifted more easily. It is then put into shape using blocks 61, 62, and 63, as shown in FIG. 6. The fiber structure 40 is positioned flat on the first block 61 and the tongue 44 is folded against the step 61a of the first block 61. The position and the folded shape of the tongue 44 is held by the second block 62. Thereafter, the side portions 43 are folded against the third block 63. The fiber structure 40 is then dried so as to stiffen it, thereby blocking the shape imparted during shaping.

The second fiber structure 50 is also obtained by three-dimensional weaving, during which each side portion 53 is woven in non-interlinked manner with a side end panel 51a of the top portion 51 so as to obtain the letter Pi shape for this second fiber structure 50. Such branching can also be obtained by crossing layers. Such non-interlinking and layer-crossing techniques are now well known in the field of three-dimensional weaving.

The second fiber structure 50 as woven in this way is then moistened and put into shape by folding its side portions 53 perpendicularly relative to its top portion 51. The fiber structure 50 is then dried so as to stiffen it, thereby blocking the shape imparted during shaping.

The two fiber structures 40 and 50 made rigid in this way are then engaged one in the other and placed in an injection mold having the dimensions of the desired final platform 30, and a matrix, in this example an epoxy matrix, is then injected therein. By way of example, such co-injection may be performed using the known resin transfer molding (RTM) method. Such co-injection during which a matrix is injected into and impregnates two fiber structures simultaneously enables the two fiber structures to be secured to each other so as to obtain a final part as a single piece. It may be observed at this point that the opening left in the bottom face of the platform between the bottom wall 32 and the top wall 31 makes it easier to design of the core of the mold, by enabling a portion of the core to be withdrawn through this opening.

At the end of this step, a platform 30 is thus obtained that is made of composite material comprising two fiber structures 40 and 50 woven using carbon fibers and embedded in an epoxy matrix. This method may optionally be finished off with machining steps in order to finalize the platform 30.

During assembly of the platform, the upstream shroud 21 is absent: the downstream step 39 is engaged under the flange 23a of the downstream drum 23, and simultaneously the fastener tab 34 is engaged in the hook 27 of the tooth 25. The upstream shroud 21 is then fitted so that its flange 21a engages over the upstream step 38 of the platform: clearance is left between these two elements in order to facilitate assembly; this clearance is small enough to ensure that centrifugal force closes it while the turbojet is in operation.

The embodiments and implementations described in the present description are given purely by way of nonlimiting illustration and, in the light of this description, a person skilled in the art can easily modify these embodiments or implementations, or can envisage others, while remaining within the ambit of the invention.

In particular, throughout the present description, it is assumed that the diameter of the module of which the bladed wheel forms a part increases on going from upstream to downstream: this is indeed true of the fan module, which presents a considerable difference in diameter between its upstream and downstream ends that needs to be compensated by the platforms. Nevertheless, the present invention naturally applies in equivalent manner to modules in which the diameter decreases from upstream to downstream: under such circumstances, it suffices to interchange "upstream" and "downstream" throughout the above description.

Furthermore, the various characteristics of these embodiments or implementation is can be used singly or in combination with one another. When they are combined, these characteristics may be combined as described above or in other ways, the invention not being limited to the specific combinations described in the present description. In particular, unless specified to the contrary, a characteristic that is described with reference to any one embodiment or implementation may be applied in analogous manner to any other embodiment or implementation.

The invention claimed is:

1. A platform for a bladed wheel having a hook projecting from a top of a tooth of a disk, the platform comprising:
   a bottom wall;
   a top wall for defining an air flow passage; and
   two side walls respectively joined to the bottom wall such that the bottom wall extends between the two side walls, the two side walls each extending transversely between the bottom wall and the top wall, wherein the side walls each terminate at an upstream end of the respective side wall, and wherein a portion of each of the side walls being located closest to the plane of the bottom wall comprises the upstream end of the respective side wall, the upstream ends of the side walls being located longitudinally upstream relative to an upstream end of the bottom wall; and wherein the platform further includes a fastener tab that is folded downstream from the upstream end of the bottom wall, to cooperate with the hook.

2. The platform according to claim 1, comprising a first fiber structure possessing a bottom portion, two side portions extending transversely from the bottom portion, and a fastener tongue that is folded downstream from the upstream end of the bottom portion.

3. The platform according to claim 2, wherein the first fiber structure is constituted by a single sheet that is woven three-dimensionally as a single piece.

4. The platform according to claim 3, wherein the height of the side portions of the first fiber structure diminishes going upstream, such that the upstream ends of said side portions taper.

5. The platform according to claim 2, further including a second fiber structure possessing a top portion and two side portions extending transversely from the top portion.

6. The platform according to claim 5, wherein the second fiber structure is engaged with the first fiber structure, the side portions of one of the fiber structures being received between the side portions of the other fiber structure.

7. A bladed wheel for a turbine engine, the wheel comprising:

a disk suitable for being coupled to a shaft of the turbine engine, the circumference of the disk presenting a succession of slots and of teeth;

a plurality of blades mounted in the slots of the disk; and at least one platform according to claim 1 provided between two blades and facing the tooth of the disk, the fastener tab of the platform co-operating with an assembly member of the tooth.

8. A turbine engine including a bladed wheel according to claim 7.

* * * * *